(12) United States Patent
Tan

(10) Patent No.: US 8,111,740 B2
(45) Date of Patent: Feb. 7, 2012

(54) TIME-DOMAIN EQUALIZER

(75) Inventor: Yaolong Tan, Jiangsu Province (CN)

(73) Assignee: Triductor Technology (Suzhou) Inc., Jiangsu Province (CN)

(*) Notice: Subject to any disclaimer, the term of this patent is extended or adjusted under 35 U.S.C. 154(b) by 757 days.

(21) Appl. No.: 12/086,968

(22) PCT Filed: Dec. 29, 2006

(86) PCT No.: PCT/CN2006/003699
§ 371 (c)(1),
(2), (4) Date: Jun. 23, 2008

(87) PCT Pub. No.: WO2007/073700
PCT Pub. Date: Jul. 5, 2007

(65) Prior Publication Data
US 2009/0290629 A1    Nov. 26, 2009

Related U.S. Application Data

(60) Provisional application No. 60/755,365, filed on Dec. 29, 2005.

(51) Int. Cl.
*H04L 27/01*    (2006.01)

(52) U.S. Cl. ........ 375/229; 375/230; 375/231; 375/232; 375/233; 375/234; 375/316; 375/340; 375/346; 375/350

(58) Field of Classification Search .......... 375/229–234, 375/316, 340, 346, 350; 708/300
See application file for complete search history.

(56) References Cited

U.S. PATENT DOCUMENTS 5,590,154 A    12/1996   Forni et al.
6,829,296 B1   12/2004   Troulis et al.

FOREIGN PATENT DOCUMENTS

CA    2 301 970 A1    9/2001
WO    WO 2004/088842 A2    10/2004

*Primary Examiner* — Leon Flores
(74) *Attorney, Agent, or Firm* — Muirhead and Saturnelli, LLC

(57) ABSTRACT

The present invention provides a cost-effective TEQ hardware architecture to support multiple VDSL2 profiles. It supports variable TEQ tap length programmable through firmware. Larger TEQ tap length at low-speed profiles is supported by the unique design without adding additional multipliers. The maximum number of TEQ taps supported is actually inversely proportional to the profile frequency. This perfectly meets the requirement to have longer TEQ for low-speed profile and shorter TEQ for high-speed profile.

9 Claims, 2 Drawing Sheets

TIME-DOMAIN EQUALIZER

CROSS-REFERENCE TO RELATED APPLICATION

The present application claims the benefit of provisional application No. 60/755,365 filed Dec. 29, 2005, the content of which is hereby incorporated by reference in its entirety.

FIELD OF THE INVENTION

The present invention relates to a time-domain equalizer, more particularly to a novel time-domain equalizer hardware architecture for supporting multiple VDSL2 profiles.

BACKGROUND OF THE INVENTION

VDSL2 refers to second-generation very-high speed digital subscriber line and the first draft standard (G.993.2) was proposed in May 2005 by the International Telecommunication Union (ITU). VDSL2 is an evolving DSL technology that aiming at delivering high data rate through copper pairs. The supported data rate can be up to 100 Mbps at each direction of downstream and upstream. Different profiles are created in order to meet the requirement of different deployment scenarios mostly related to the loop distance. The following table shows all the supported profiles:

Time-domain equalizer is a technology aiming at shortening the channel response length so that the inter-symbol-interference between consecutive DMT frames can be alleviated. The time-domain equalizer is usually implemented as a FIR filter. The number of FIR taps depends on the loop length. Usually longer loop requires longer FIR filter. On the other hand, longer loop means lower transmission band since strong attenuation on the high frequency makes SNR low and effectively no bit can be loaded. Therefore, longer loop also implies low profiles such as 8.5 MHz etc.

The VDSL2 standard defines multiple profiles to support different frequency ranges from 8.5 MHz to 30 MHz. The backward compatibility requirement further extends the VDSL2 frequency as low as 1.104 MHz. Time-domain equalizer is usually used to reduce the inter-symbol-interference across neighboring symbols. To achieve an optimal system performance, the required number of TEQ taps is different for different profiles. High-speed profiles such as 17 MHz and 30 MHz require less TEQ taps due to short loop distance. Low-speed profiles such as ADSL2 spectrum 2.208 MHz or 8.5 MHz require higher number of TEQ taps due to longer channel response caused by the long loop distance. Therefore, it is very important to design cost-effective time-domain equalizer hardware to meet different profile requirement if a multi-profile ASIC solution is desired.

VDSL2 profiles

| Frequency plan | Parameter | Parameter value for profile | | | | | | | |
| --- | --- | --- | --- | --- | --- | --- | --- | --- | --- |
| | | 8a | 8b | 8c | 8d | 12a | 12b | 17a | 30a |
| All | Maximum aggregate downstream transmit power (dBm) | +17.5 | +20.5 | +11.5 | +14.5 | +14.5 | +14.5 | +14.5 | +14.5 |
| All | Maximum aggregate upstream transmit power (dBm) | +14.5 | +14.5 | +14.5 | +14.5 | +14.5 | +14.5 | +14.5 | +14.5 |
| All | Sub-carrier spacing(s) (kHz) | 4.3125 | 4.3125 | 4.3125 | 4.3125 | 4.3125 | 4.3125 | 4.3125 | 8.625 |
| All | Support of upstream band zero (US0) | Required | Required | Required | Required | Required | Not Required | Not Required | Not Required |
| All | Minimum net aggregate data rate capability (Mbit/s) | 50 Mbit/s | 50 Mbit/s | 50 Mbit/s | 50 Mbit/s | 68 Mbit/s | 68 Mbit/s | 100 Mbit/s | 200 Mbit/s |
| All | Aggregate interleaver and de-interleaver delay (octets) | 65,536 | 65,536 | 65,536 | 65,536 | 65,536 | 65,536 | 98,304 | 131,072 |
| All | $D_{max}$ | 2048 | 2048 | 2048 | 2048 | 2048 | 2048 | 3072 | 4096 |
| All | $1/S_{max}$ downstream | 24 | 24 | 24 | 24 | 24 | 24 | 48 | 28 |
| All | $1/S_{max}$ upstream | 12 | 12 | 12 | 12 | 24 | 24 | 24 | 28 |

Lower profiles such as 8a~12b are used to support medium range loop length with a distance between 3 kft to 8 kft while high speed profiles 17a~3a are used to support short range loop length of less than 3 kft. Only 30 MHz profile 30a is able to support 100 Mbps on both upstream and downstream while 17 MHz profile 17a can support aggregated 100 Mbps.

SUMMARY OF THE INVENTION

One of most costly hardware components in the time-domain equalizer is multiplier. In order to reduce the hardware cost of the time-domain equalizer as well as to reduce the power consumption, a careful design is needed to optimize the use of multipliers. In this proposal, we propose a unique TEQ hardware architecture based on this objective. Our TEQ architecture can be programmable to support longer TEQ filter length with the same number of multipliers when low-frequency profiles such as 8.5 MHz or ADSL2 spectrum are used.

The present invention provides a cost-effective TEQ hardware architecture to support multiple VDSL2 profiles. It supports variable TEQ tap length programmable through firmware. Larger TEQ tap length at low-speed profiles is supported by the unique design without adding additional multipliers. The maximum number of TEQ taps supported is actually inversely proportional to the profile frequency. This perfectly meets the requirement to have longer TEQ for low-speed profile and shorter TEQ for high-speed profile.

In accordance with the present invention, a time-domain equalizer comprising $M_{OPT}$ multipliers, $$M_{OPT} = \left\lfloor \max\left(\frac{T_0}{N}, \frac{T_1}{2N}, \frac{T_2}{4N}, \frac{T_3}{16N}\right) \right\rfloor$$

wherein $T_0$ being the taps required by the 30*a* profile of VDSL2, $T_1$ being the taps required by the 12*a*, 12*b*, 17*a* profile of VDSL2, $T_2$ being the taps required by the 8*a*, 8*b*, 8*c*, 8*d* profile of VDSL2, $T_3$ being the taps required by ADSL2+ downstream; and the factor $N \geq 1$ and usually being chosen as an integer; and wherein the multiplier carrying out a multiplication operation at every system clock cycle.

In accordance with one embodiment of the invention, the said equalizer is configured so that the ADC_DATA coming from the ADC in the analog-front-end is pushed into the time-domain equalizer depending on the Nyquist frequency of the profile; the ADC_DATA_RDY is used to qualify the ADC_DATA and the ADC_DATA_RDY assertion will advance the data delay-line (MUXs) among the delay line registers (d( . . . )Regs); the Stage 1 Counter to control which taps and corresponding coefficients are multiplexed into the $M_{OPT}$ multipliers, it being reset by the ADC_DATA_RDY assertion and then it will start the counting process from zero until it reaches the configuration register L; the results of those multiplications are summed together; the accumulator basically accumulates and stores the summation results for different stages; when the Stage 1 Counter is reset to zero and the first summation $$\sum_{k=0}^{M_{OPT}} d(k)c(k)$$

is directly clocked into the accumulator; otherwise, the accumulator is added together with the summation from the current stage and stored; and when the Stage 1 Counter reaches the final stage L, it will signal the TEQ_OUT_RDY to next module in the data-path to latch the TEQ_OUT_DATA from the accumulator.

In accordance with another embodiment of the invention, the said equalizer further comprising to utilize the time-shared multipliers to support different time-equalization requirement for different profiles so that it can support longer deployment loops without additional multipliers for finite impulse response filter.

Our focus is VDSL2 application. However, the same technology is applicable to other applications such as WiMAX etc.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE MENTION

Time-Domain Equalizer Architecture

To understand our TEQ architecture, it is necessary to understand the relationship between our system clock frequency and the profile-specific frequency. Each profile actually defines a minimum frequency requirement that used at the physical layer, which is basically the Nyquist frequency or twice of the profile frequency. The sampling frequency on the AFE can be different depending on if or no over-sampling is used. On the other hand, the system clock frequency is basically the clock frequency used to drive the digital data-path circuit such as our time-domain equalizer. In general, the choice of the system clock frequency should be based on the highest physical frequency as well as the computational requirement across all the data-path modules. In the case of VDSL2, the highest physical frequency comes from the 30 MHz profile, which has 4096 sub-carriers and 8.625 KHz tone spacing. This means that the sampling frequency for the analog-to-digital converter needs to be at least 70.656 MHz. Therefore, the data-path needs to at least process the ADC data at that rate. Therefore, the system clock frequency can be chosen as 70.656N MHz, where the factor $N \geq 1$ and usually N is chosen as an integer in practical implementation. Another important factor in choosing the system clock is the ASIC processing technology because the ASIC processing technology determines how fast the key circuits such as multiplier can switch within one system clock cycle. In our system we choose 141.312 MHz with N=2. However, our time-domain equalizer architecture does not really depend on a particular system clock frequency. For 0.13 um or 0.18 um ASIC processing, it will be no problem to run a 16×16 multiplier in a single clock cycle of 141.312 MHz. Since the multiplier is a very costly hardware component, an efficient time-domain equalizer design shall always try to optimize the number of multipliers. On the other hand, the system performance requirement determines the number of multiplications that the time-domain equalizer has to carry out. Therefore, the question really becomes how efficiently each multiplier is used in the time-domain equalizer.

Figure 1:
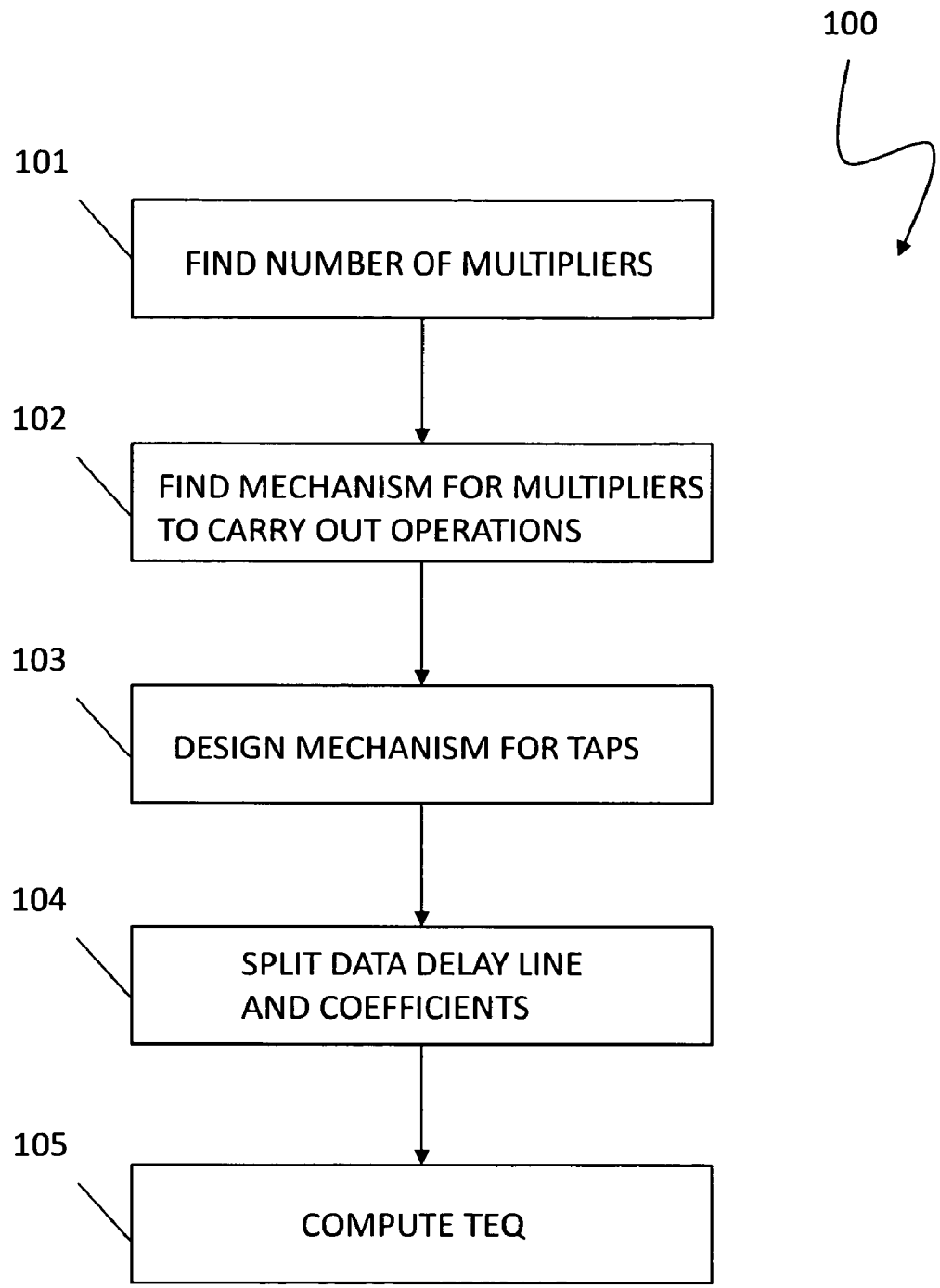
FIG. 1 is a flow diagram showing processing according to the system described herein.

FIG. 1 is a flow diagram 100 showing processing according to the system described herein. Since here we propose a general time-domain equalizer, we do not discuss how many multipliers are actually needed to support for all VDSL2 profiles. We assume that a total of M multipliers are available to implement the time-domain equalizer. The optimal design of efficiently using multipliers is to make sure that the full computational power of the multipliers is used. In other words, the multiplier shall be utilized for multiplication at every system clock cycle. This is actually the basic starting point of our time-domain architecture design. Given a total of M multipliers and 70.656N MHz system clock frequency, our time-domain architecture is able to support up to the following time-domain equalizer filter tap length:

| Profile | Maximum TEQ Tap Length | Example With M = 8, N = 2 |
| --- | --- | --- |
| 30a | M × N | 16 |
| 12a, 12b, 17a | 2 × M × N | 32 |
| 8a, 8b, 8c, 8d | 4 × M × N | 64 |
| ADSL2+ Dowstream | 16 × M × N | 256 |

The above tap length is only the upper-bound based on the multiplier processing capability. To minimize the hardware cost, referring to FIG. 1, the first step 101 is to find the number of required multipliers to support all profiles. Now we assume that through the system simulation, we found that the 30a profile requires $T_o$ taps, 12a, 12b, 17a profiles require $T_1$ taps, 8a, 8b, 8c, 8d profiles require $T_2$ taps, ADSL2+ downstream requires $T_3$ taps. The problem becomes to find the optimal M value to satisfy the following condition:

$$M \times N \geq T_0, 2 \times M \times N \geq T_1, 4 \times M \times N \geq T_2, 16 \times M \times N \geq T_3,$$

which results in $$M_{OPT} = \left\lfloor \max\left(\frac{T_0}{N}, \frac{T_1}{2N}, \frac{T_2}{4N}, \frac{T_3}{16N}\right) \right\rfloor,$$

where $\lfloor . \rfloor$ means roundup to the closest integer.

After finding the optimal number of required multipliers $M_{OPT}$, the actual number of taps can be supported for each profile becomes $M_{OPT} \times N$, $2 \times M_{OPT} \times N$, $4 \times M_{OPT} \times N$, $16 \times M_{OPT} \times N$ respectively and are definitely larger than each profile requirement $T_0, T_1, T_2, T_3$. Now the next step 102 is to find the mechanism so that the multipliers can be efficiently in a way that every cycle the multiplier carries out a multiplication operation. In additional the number of time-domain equalizer taps can be programmable in a flexible approach. In our scheme, in step 103 we use $M_{OPT}$ as our base and design a mechanism so that the supported TEQ taps are multiple of $M_{OPT}$, i.e., $M_{OPT} \times l$ and $1 \leq L$ is a programmable factor set by the firmware and L corresponds to the maximum supported tap length. In order to running $M_{on}$ multipliers at the same time, in a step 104, we need to split the data delay-line d(k), k=0, 1, ..., $M_{OPT} \times l - 1$ and the coefficients c(k), k=0, 1, ..., $M_{OPT} \times l - 1$ into l segments of $M_{OPT}$ each. Thus, in a step 105, the computation of FIR filter can be formulated as the following (here we only take one computation instance since we focus on hardware implementation):

$$TEQ = \sum_{k=0}^{M_{OPT} \times l - 1} d(k)c(k)$$
$$= \sum_{k_2=0}^{l-1} \sum_{k_1=0}^{M_{OPT}-1} d(k_2 l + k_1)c(k_2 l + k_1)$$

Here we only proposed one way of breaking the time-domain equalizer computation. There are other different ways as well and we do not enumerate them one by one. The fundamental idea is to break the time-domain equalizer computation into multiple segments to fit the multiplier computation that may run every system clock cycle.

Figure 2:
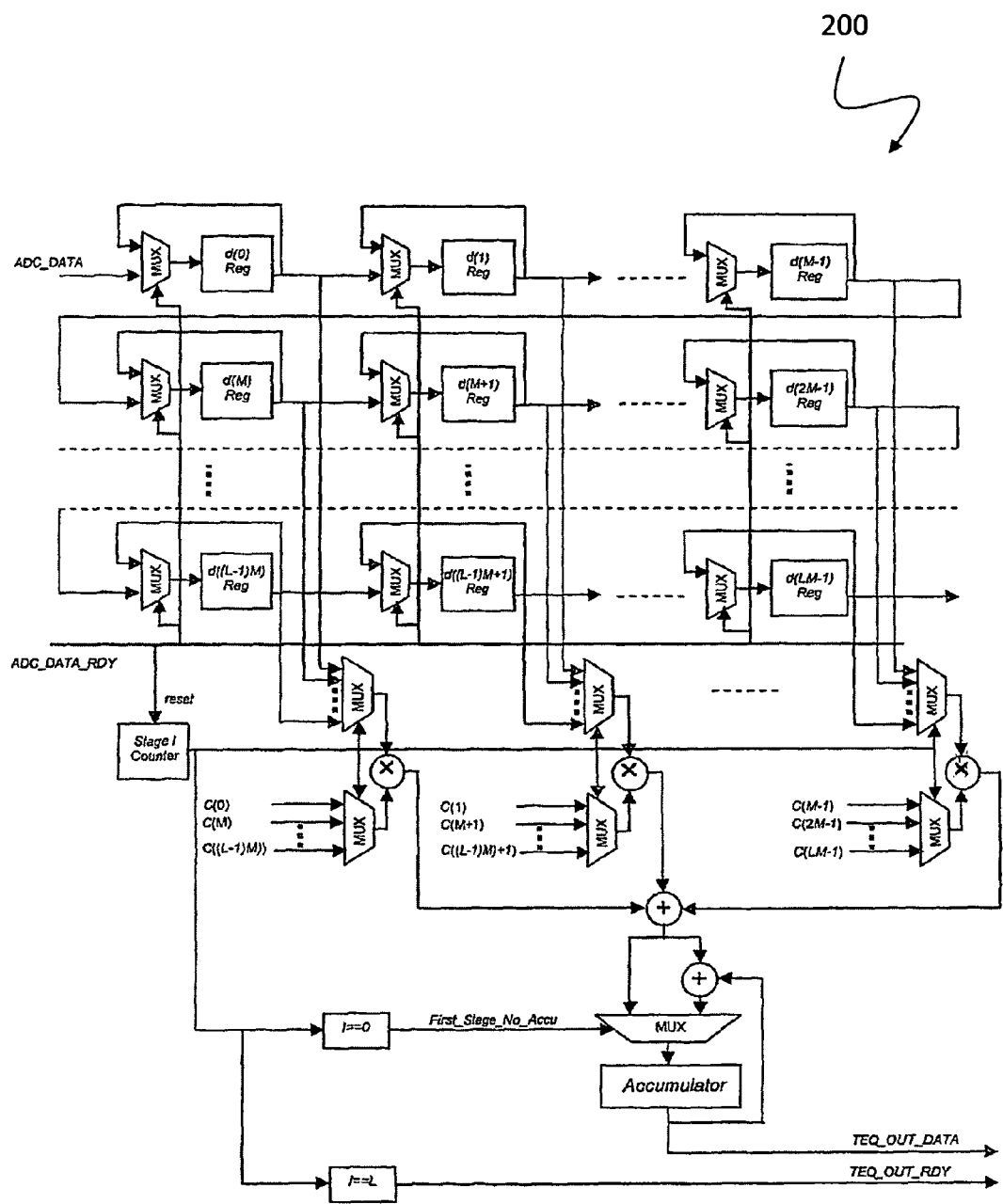
FIG. 2 shows the time-domain equalizer hardware architecture for multiple VDSL2 profile support in accordance with the present invention.

FIG. 2 shows our time-domain equalizer hardware architecture 200. The ADC_DATA comes from the ADC in the analog-front-end and the ADC_DATA_RDY is used to qualify the ADC_DATA. How often the ADC_DATA is pushed into our time-domain equalizer actually depends on the Nyquist frequency of the profile. For lower-speed profiles, the rate of ADC_DATA is lower proportionally. In other words, more system clock cycles will be available for lower-speed profiles between two consecutive ADC_DATA_RDY assertions. This is actually the basic idea of our time-domain equalizer hardware: to explore the physical signal property to efficiently utilize costly ASIC components such as multipliers. The ADC_DATA_RDY assertion will advance the data delay-line as shown by the MUXs among the delay line registers. The Stage 1 Counter is reset by the ADC_DATA_RDY assertion and then it will start the counting process from zero until it reaches the configuration register L. The register L actually determines how many taps the time-domain equalizer is configured $M_{OPT} \times L$ to be more precise). The register L is configured by the firmware through the microprocessor interface. There is a maximum limit for the register L based on different profile according to how many system clock cycles between two consecutive ADC_DATA_RDY. The purpose of the Stage 1 Counter is to control which taps and corresponding coefficients are multiplexed into the $M_{OPT}$ multipliers. The results of those multiplications are summed together. In our diagram, we do not split the addition process. However, if the ASIC process speed is a concern for the adder, we can see that the addition can split into multiple adders with some registers to hold the partial-summation results, which we do not show in this figure.

The accumulator basically accumulates and stores the summation results for different stages. When the Stage 1 Counter is reset to zero and the first summation $$\sum_{k=0}^{M_{OPT}} d(k)c(k)$$

is directly clocked into the accumulator. Otherwise, the accumulator is added together with the summation from the current stage and stored. When the Stage 1 Counter reaches the final stage L, it will signal the TEQ_OUT_RDY to next module in the data-path to latch the TEQ_OUT_DATA from the accumulator.

In our design, the tap coefficients c(k), k=0, 1, ..., $M_{OPT} \times l - 1$ are configurable and adapted through the microprocessor interface. So, the TEQ algorithm of finding the optimal coefficients for the time-domain equalizer runs on the microprocessor while the TEQ filter computation is done in hardware.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:
1. A method for computing a configuration of a time-domain equalizer, comprising:
   determining, using at least one processor, a number ($M_{OPT}$) of multipliers, wherein $$M_{OPT} = \left\lfloor \max\left(\frac{T_0}{N}, \frac{T_1}{2N}, \frac{T_2}{4N}, \frac{T_3}{16N}\right) \right\rfloor$$

wherein $\lfloor . \rfloor$ means roundup to the closest integer, wherein $T_0$ being the taps required by the 30a profile of a very fast digital subscriber line 2 standard (VDSL2), $T_1$ being the taps required by the 12a, 12b, 17a profile of VDSL2, $T_2$ being the taps required by the 8a, 8b, 8c, 8d profile of VDSL2, $T_3$ being the taps required by an asymmetric digital subscriber line 2+ standard (ADSL2+) downstream; and the factor $N \geq 1$ and being chosen as an integer, wherein each of the $M_{OPT}$ multipliers carries out a multiplication operation at every system clock cycle, and wherein, for a data delay-line $d(k)$, $k=0, 1, \ldots, M_{OPT} \times l - 1$ and coefficients $c(k)$, $k=0, 1, \ldots, M_{OPT} \times l - 1$ being split into 1 segments of $M_{OPT}$ each, the computation of the time-domain equalizer (TEQ) is:

$$TEQ = \sum_{k=0}^{M_{OPT} \times l - 1} d(k)c(k) = \sum_{k_2=0}^{l-1} \sum_{k_1=0}^{M_{OPT}-1} d(k_2 l + k_1) c(k_2 l + k_1).$$

2. The method of claim 1, wherein the supported taps are multiple of $M_{OPT}$, i.e., $M_{OPT} \times l$, $1 \leq L$ and l is a programmable factor set by the firmware, and L corresponds to the maximum supported tap length.

3. The method of claim 1, wherein the time-domain equalizer computation is broke into multiple segments to fit the multiplier computation that may run every system clock cycle.

4. A time-domain equalizer, comprising:
$M_{OPT}$ multipliers, $$M_{OPT} = \left\lfloor \max\left(\frac{T_0}{N}, \frac{T_1}{2N}, \frac{T_2}{4N}, \frac{T_3}{16N}\right) \right\rfloor$$

wherein $\lfloor . \rfloor$ means roundup to the closest integer, wherein $T_0$ being the taps required by the 30a profile of a very fast digital subscriber line 2 standard (VDSL2), $T_1$ being the taps required by the 12a, 12b, 17a profile of VDSL2, $T_2$ being the taps required by the 8a, 8b, 8c, 8d profile of VDSL2, $T_3$ being the taps required by an asymmetric digital subscriber line 2+ standard (ADSL2+) downstream; and the factor $N \geq 1$ and being chosen as an integer, wherein each of the $M_{OPT}$ multipliers carries out a multiplication operation at every system clock cycle, wherein the time-domain equalizer computation is broke into multiple segments to fit the multiplier computation that may run every system clock cycle, wherein a data delay-line $d(k)$, $k=0, 1, \ldots, M_{OPT} \times l - 1$ and coefficients $c(k)$, $k=0, 1, \ldots, M_{OPT} \times l - 1$ are split into 1 segments of $M_{OPT}$ each, and wherein a computation of the time-domain equalizer (TEQ) is:

$$TEQ = \sum_{k=0}^{M_{OPT} \times l - 1} d(k)c(k)$$

$$= \sum_{k_2=0}^{l-1} \sum_{k_1=0}^{M_{OPT}-1} d(k_2 l + k_1) c(k_2 l + k_1), \text{ and}$$

wherein the equalizer is further configured so that:

ADC_DATA coming from an analog to digital converter (ADC) in the analog-front-end is pushed into the time-domain equalizer depending on the Nyquist frequency of the profile;

ADC_DATA_RDY is used to qualify the ADC_DATA and the ADC_DATA_RDY assertion will advance the data delay-line (MUXs) among delay line registers (d ( . . . )Regs);

Stage 1 Counter to control which taps and corresponding coefficients are multiplexed into the $M_{OPT}$ multipliers, it being reset by the ADC_DATA_RDY assertion and then it will start the counting process from zero until it reaches the configuration register L;

the results of those multiplications are summed together;

an accumulator basically accumulates and stores the summation results for different stages; when the Stage 1 Counter is reset to zero and the first summation $$\sum_{k=0}^{M_{OPT}} d(k)c(k)$$

is directly clocked into the accumulator; otherwise, the accumulator is added together with the summation from the current stage and stored; and when the Stage 1 Counter reaches the final stage L, it will signal the TEQ_OUT_RDY to next module in the data-path to latch the TEQ_OUT_DATA from the accumulator.

5. The equalizer of claim 4, wherein the register L is configured by the firmware through the microprocessor interface.

6. The equalizer of claim 4, wherein there is a maximum limit for the register L based on different profile according to how many system clock cycles between two consecutive ADC_DATA_RDY.

7. The equalizer of claim 4, wherein the addition can be split into multiple adders with some registers to hold the partial-summation results if a process speed is a concern for the adder.

8. The equalizer of claim 4, wherein the tap coefficients $c(k)$, $k=0, 1, \ldots, M_{OPT} \times l - 1$ are configurable and adapted through the microprocessor interface.

9. The equalizer of claim 4, further comprising to utilize the time-shared multipliers to support different time-equalization requirement for different profiles so that it can support longer deployment loops without additional multipliers for finite impulse response filter.

* * * * *